March 10, 1959     T. WERNER     2,876,914
METHOD OF AND APPARATUS FOR SUPPLYING MATERIAL
TO A BIN OR THE LIKE
Filed Oct. 23, 1956     5 Sheets-Sheet 1
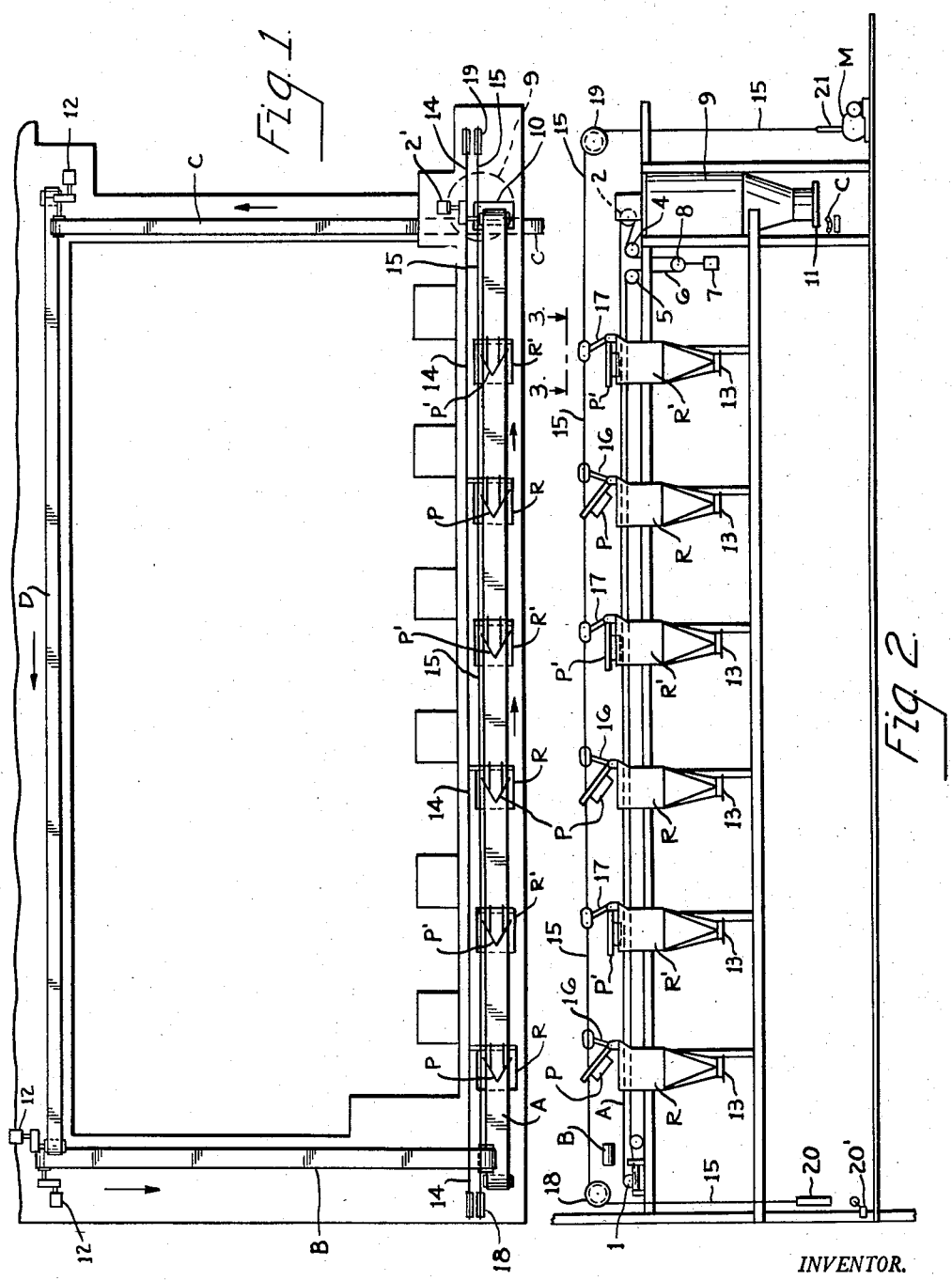
INVENTOR.
TAGE WERNER
BY Bosworth, Sessions,
Herstrom & Knowles
ATTORNEYS.

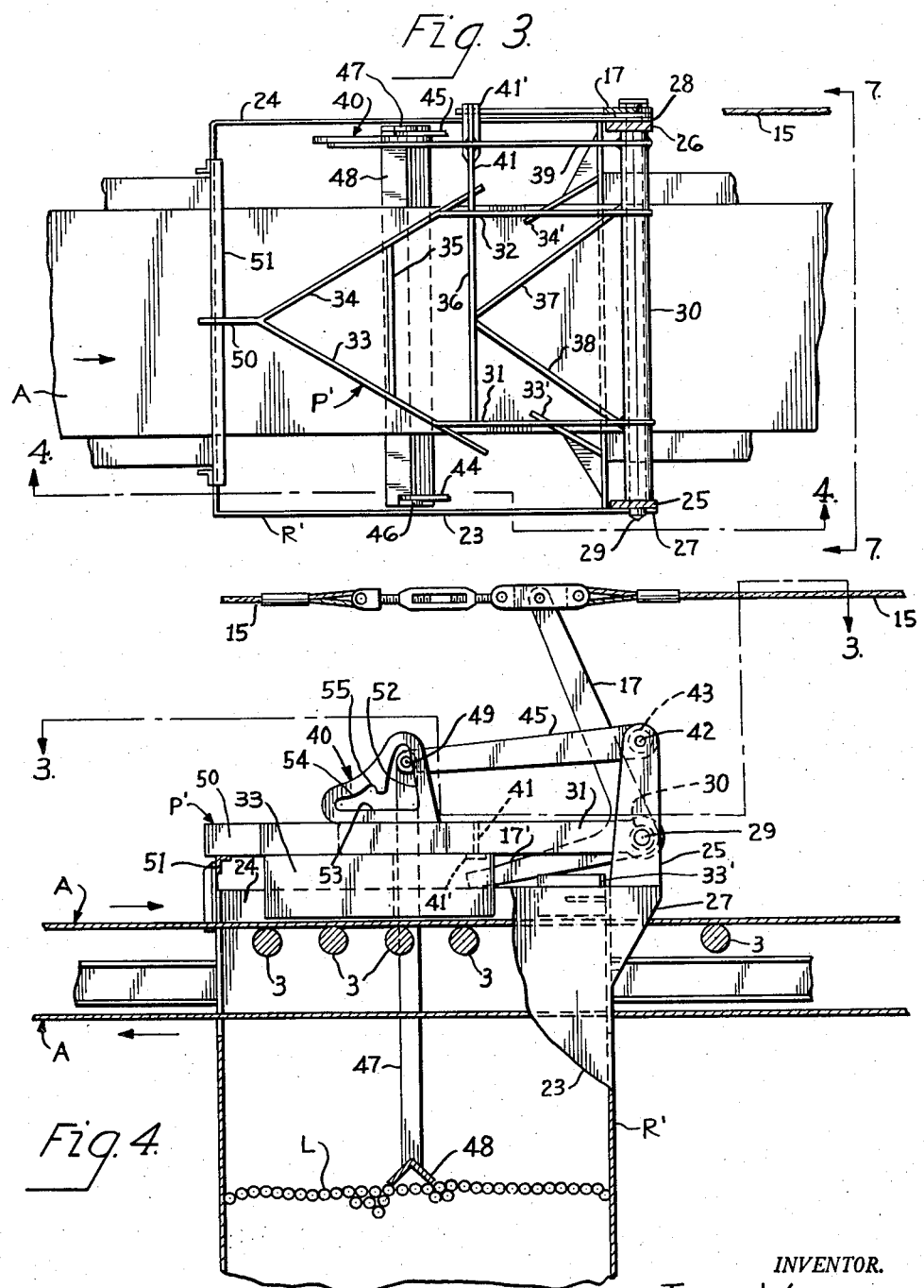

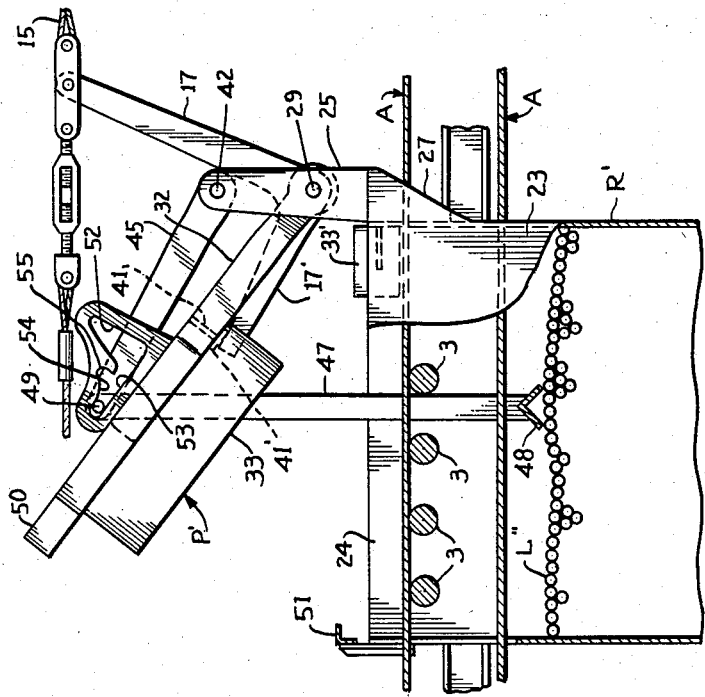
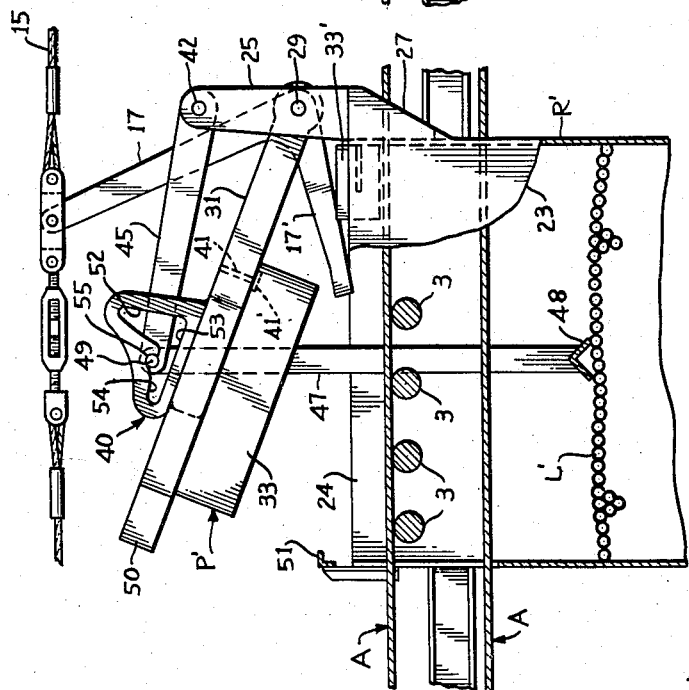
INVENTOR.
TAGE WERNER

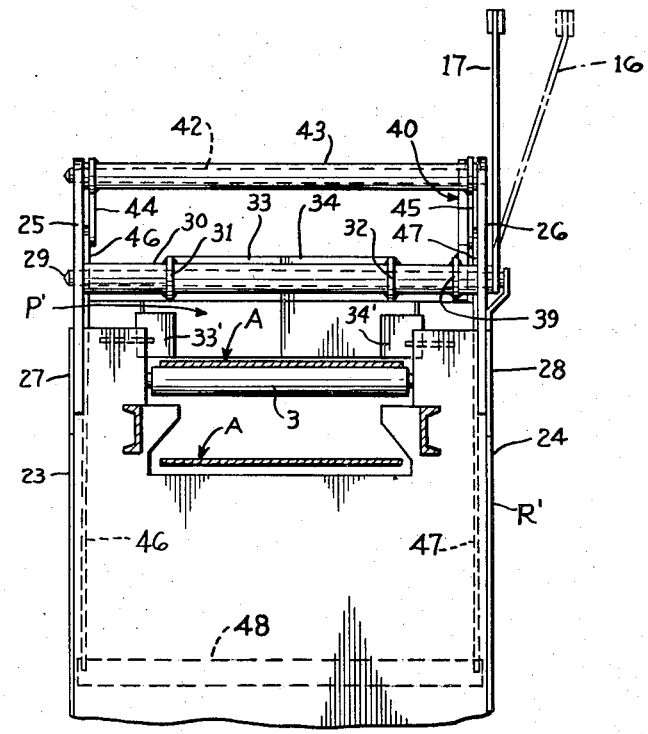

March 10, 1959 T. WERNER 2,876,914
METHOD OF AND APPARATUS FOR SUPPLYING MATERIAL
TO A BIN OR THE LIKE
Filed Oct. 23, 1956 5 Sheets-Sheet 5

INVENTOR.
TAGE WERNER
BY
ATTORNEYS

United States Patent Office 2,876,914
Patented Mar. 10, 1959

2,876,914

METHOD OF AND APPARATUS FOR SUPPLYING MATERIAL TO A BIN OR THE LIKE

Tage Werner, Rocky River, Ohio, assignor to Arthur G. McKee & Company, Cleveland, Ohio, a corporation of Delaware Application October 23, 1956, Serial No. 617,804

6 Claims. (Cl. 214—17)

This invention relates to methods of and apparauts for ditsributing loose flowable solid material, and more particularly to improvements in methods of and means for maintaining one or more bins or receptacles filled with powdered coal, gravel, or other loose flowable solid material, substantially up to a predetermined level regardless of whether the amount of material withdrawn from the lower part of the receptacle be zero or substantially above the normal withdrawal.

In various situations where loose flowable solid materials are being handled the material is charged into an open topped bin or hopper and withdrawn as needed from the bottom thereof. In certain of these applications the withdrawal from the bottom may vary from a predetermined normal amount during a given time period down to zero or up to several times normal. It is an object of the present invention to provide a method of and means for automatically and continuously supplying material to a bin, or series of bins, discharging same into the bin or bins only when the level therein falls to a predetermined value, limiting the amount discharged into the hopper, and positively preventing overfilling thereof at any time.

Other objects of my invention include: the provision of material distribution apparatus including a belt conveyor and one or more open topped receptacles disposed below and between the ends of the conveyor, together with means for automatically scraping material from the belt into the receptacle or receptacles but only when material is needed to maintain a desired predetermined level; the provision of means for intermittently scraping material from a belt conveyor into a bin disposed therebelow on a predetermined timed cycle and rendering the scraper means inoperative whenever the level of material in the bin is at or above a predetermined value; and, the provision, in material supplying and distributing apparatus of the type described, of means for returning surplus material not required to maintain the bins filled to the predetermined level back to the charging end of the apparatus and adding additional material sufficient to provide a constant supply of material at said charging end.

The above and other objects of my invention will appear from the following description of one embodiment thereof in which my improved distribution apparatus is arranged to maintain a supply of powdered coal, or other flowable solid material, for a series of bins disposed in spaced relation beneath and between the ends of a continuously driven conveyor belt.

In the accompanying drawings:

Figure 1 is a diagrammatic plan view of a material supply and distribution installation made in accordance with my invention.

Figure 2 is a side elevation of the apparatus shown in Figure 1.

Figure 3 is an enlarged plan view, taken substantially on line 3—3 of Figure 2 and illustrating a portion of the material supply conveyor belt, one of the bins disposed therebelow, and the plow mechanism for scraping material from the belt into the bin, said plow mechanism being disposed in its lower or plowing position.

Fig. 4 is an elevational view, taken substantially on line 4—4 of Figure 3 and illustrating the plow operating mechanism in the position it assumes when the level of material in the bin is low enough to call for material and the plow has been lowered into its lowermost plowing position, but prior to substantial removal of material from the belt by the plow.

Figure 5 is a view similar to Figure 4 but illustrating a level of material in the bin sufficiently high that additional material is not required, the plow being held in elevated, non-plowing position out of the path of material on the supply belt.

Figure 6 is a view similar to Figure 4 but illustrating the plow in its uppermost position in which it is held between plowing operations.

Figure 7 is an end elevation of the apparatus shown in Figure 3, taken substantially on line 7—7 of Figure 3.

Figure 8:
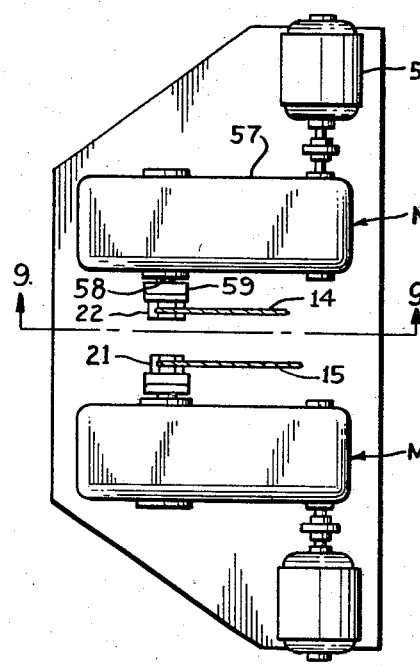
Figure 8 is an enlarged detached plan view of the drive means for operating the plow lifting and lowering cables.

Referring now particularly to Figures 1 and 2, the complete material supply and distributing installation includes an elongated endless main supply belt A which extends over suitable rollers 1 and 2 at its loading and discharge ends respectively. Roller 2 is driven, as by the motor 2′, to cause the upper reach of belt A to move from left to right as seen in Figures 1 and 2. This upper reach of belt A is maintained in a substantially horizontal plane by suitable idler rolls, not seen in Figures 1 and 2, but indicated at 3 in Figure 4. To maintain proper tension on belt A the lower reach may pass over rollers 4 and 5 and a loop portion 6 of the belt depend therebetween. A weight 7 may be carried by a free roller 8 at the bottom of loop 6 and the load imposed by the weight 7 automatically maintains proper tension on the belt A. Of course any other suitable belt tensioning means may be employed.

Material is supplied to the loading (left hand in Figures 1 and 2) end of belt A by transverse conveyor belt B. Material which remains on belt A at the discharge (right hand as seen in Figures 1 and 2) end thereof is deposited into an overflow bin 9 through a suitable opening 10 in the top thereof. The overflow bin 9 has a controllable bottom discharge outlet 11 which is positioned above the transverse conveyor belt C and is adapted to discharge material thereon at a controllable rate. As is seen in Figure 1, the belt C extends to the longitudinal conveyor belt D and deposits material on the charge end thereof. In the opposite direction the belt C extends to a suitable original material supply station which is not shown herein as its details form no part of the present invention. This main supply station, during operation of the apparatus, feeds a constant supply of material to the belt C and, as belt C passes beneath the outlet 11 of the overflow bin 9, additional material is deposited thereon from bin 9 to provide the desired total, and substantially constant and uniform, quantity of material per unit of time (for example, tons per minute) that is to be delivered to and maintained on the charge end of the main supply belt A.

The longitudinal conveyor belt D, which is of substantially the same length as main supply belt A, conveys the material to the charging end of transverse belt B which, in turn, carries the material to main supply belt A. Each of the belts B, C and D is driven by suitable means, such as the electric motors 12, and all move at substantially the same rate as belt A. Material which is loaded on belt C from the original supply source and from the overflow bin 11 is carried by belts C, D and B to the loading end of the main supply belt A. Any material which remains on belt A after it passes over the series of receiving bins, which will be later described, is discharged into the top overflow bin 11 from which it is recirculated around the belt system.

Disposed at equally spaced intervals along the main supply belt A is a series of receptacles in the form of open topped receiving bins R and R'. Both the upper and lower reaches of belt A pass over the open tops of these bins and each is provided with a suitable controlled discharge outlet 13 through which material may be withdrawn as required for further use.

The installation illustrated in the drawing is particularly designed for supply powdered coal to a plurality of rotating drums (not shown) in which the powdered coal is coated on pellets of concentrated iron ore preparatory to a heat hardening treatment of the pellets in a furnace. As the amount of material withdrawn from each of the bins R and R' depends upon the requirements of the particular drum supplied by the bin, and as any given drum may be shut down at any given time or operating at a faster or slower than normal rate, the withdrawal from the bins R and R' is not uniform. However it is desired to maintain in each bin at all times a supply of material well up to the top of the bin so that, if at any time the conveyor system fails or material is not properly delivered to the receiving bins for any other reason, reserve supply will always be in each bin R and R' to maintain the plant in operation for sufficient time to correct the difficulty and get the material flowing again on the conveyor system.

In order to remove material from the top reach of belt A into the open tops of the bins R and R', I provide plow or scraper devices P and P' which are supported on the upper portion of each of the hoppers R and R' respectively. In the illustrated installation the first, third and fifth from the left bins R of the six illustrated have their plows P operated by a cable 14 while the second, fourth and sixth bins R' have their plows P' operated by a second cable 15 which is parallel to and horizontally spaced from cable 14 and operated independently thereof as will appear more fully later. Cable 14 is secured to the offset plow operating arms 16 of the plows P on the bins R while the cable 15 is secured to the straight plow operating arms 17 of the plows P' on the bins R' (see Figure 7 in which the offset arms which are used with plows P are shown in phantom lines).

As best seen in Figure 2, the cable 15 passes over sheaves 18 and 19 suitably supported beyond the opposite ends of the main belt A. A counterweight 20 is secured to the end portion of cable 15 below the sheave 18 and the opposite end portion is attached to the connecting link 21 of the plow operating mechanism M which is mounted on the floor below the sheave 19. Similar sheaves carry the cable 14 and a similar counterweight is attached to its left hand (Figure 1) end. The right hand end of cable 14 is secured to the connecting link 22 of the plow operating mechanism M' which lifts and lowers the plows P (see Figures 8 and 9).

Figure 9:
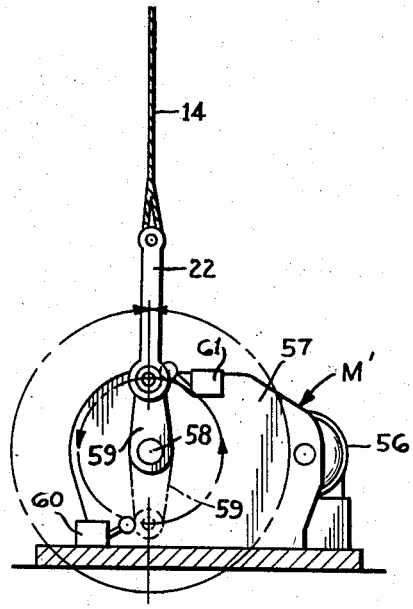
Figure 9 is a vertical sectional view, taken substantially on line 9—9 of Figure 8, and showing the drive means for one of the plow operating cables in the position it assumes when its plows are in their lowered, material moving positions.

The plow operating mechanisms M and M' are illustrated in Figures 8 and 9 and their operation will be described more fully later. However it may be pointed out here that, as seen in Figure 1, the operating mechanism M would be in a position in which the link 21 is "up," permitting the counterweight 20 to move the cable 15 in plow lowering direction (to the left in Figure 1) to the limit of its permitted movement, thus enabling the plows P' of the bins R' to be lowered into their plowing positions adjacent the belt A as seen in Figure 2.

The operation of the plow operating mechanisms M and M' is so timed that when the link 21 of mechanism M is in its "up" or plow lowered position the link 22 of operating mechanism M' is in its "down" or plow raised position, and vice versa. Although all of the plows P and P' could be connected to, and be operated by, a single operating mechanism so that all six plows would be up at the same time and all would be simultaneously released for movement into plowing position (if the particular bin requires filling), the illustrated arrangement, where half the plows are actuated by one mechanism and the other half by another independent but similar mechanism, reduces the frequency of the operation of the individual plow operating units and each unit will handle only half of the load that would have to be handled by a single operating unit if all plows were connected to a single cable.

Figures 3-7 illustrate one of the plow support and control units whereby the plows are dropped into their lower plowing positions only when the level of material in the bin with which the plow is associated has fallen to a predetermined value. The bin R' is generally rectangular in cross section and open on top. Both the upper and the lower reaches of the main supply belt A pass over the open top of the bin, the end walls thereof being cut away to accommodate the belt A while the front and rear walls 23 and 24 extend upwardly somewhat above the upper reach of belt A. Bracket members 25 and 26 are carried by extensions 27 and 28 on the walls 23 and 24 respectively and extend upwardly to provide spaced supports for the several elements of the plow mechanism.

The plow P' is carried by a supporting shaft 29 extending between the brackets 25 and 26 and includes a tubular sleeve member 30 which is rotatably carried by the shaft 29, plow support arms 31 and 32 secured to sleeve 30 and carrying at their outer ends the V-shaped plow plates 33 and 34, and suitable reinforcing members 35, 36, 37 and 38 are disposed as seen in Figure 3 to provide a properly rigid structure.

Also carried by and forming a part of the plow structure just described is a control cam carrying arm 39 having a control cam, generally indicated at 40, mounted on its outer end. The plow lifting arm 41, having a contact face member 41' at its outer end, constitutes an extension of the reinforcing member 36 and projects out beyond the rear wall 24 of the bin R'.

Pivotally mounted on the outer end of shaft 29 for rotation independently of the sleeve 30 of plow structure P' is the plow operating arm 17 which extends generally upwardly and has an angle plow lifting portion 17' extending generally horizontally with its outer end disposed below and adapted to engage the contact face 41' of the plow lifting arm 41. Relatively short stationary clean off blades 33' and 34' (see Figure 3) may be mounted on the top of bin R' generally parallel to but spaced from movable plow plates 33 and 34. These assist in preventing spillage from the belt A between bins.

The level control bar carrying shaft 42 extends across between and is carried by the upper ends of brackets 25 and 26 and has mounted thereon a rotatable sleeve 43 (see Figure 7). At the outer ends of sleeve 43 are generally horizontally projecting level control bar carrying arms 44 and 45. Depending links 46 and 47 are pivotally supported at the outer ends of arms 44 and 45 respectively and a level control bar 48 extends between and is rigidly secured to the lower ends of the links 46 and 47.

As previously noted, the control cam member 40 is mounted on the control cam carrying arm 39 of the plow structure P'. As clearly seen in Figure 4, the cam 40 has an internal irregularly shaped cam surface which is adapted to be engaged by a suitable pin or roller 49 carried by the arm 45 and disposed at the pivot point between the outer end of arm 45 and depending link 47.

The operating cable 15 is secured to the upper end of plow operating arm 17 and is movable between plow fully lowered position as seen in Figure 4 and plow fully raised position as seen in Figure 6. This movement of arm 17 is controlled by the plow operating mechanism M which will more fully be described later but it is pointed out here that the plow lifting movement of the arm 17 (clockwise as seen in Figures 4–6) is effected by the driving motor of the unit M while plow lowering movement (counter-clockwise as seen in Figures 4–6), although controlled by unit M, is effected by the counterweight 20. A safety limit switch 20' may be disposed below counterweight 20 for opening the electrical circuit to the unit M if the counterweight should engage the switch due to cable breakage or other reason.

In Figures 3 and 4 the parts are in the positions they assume when the level L of the material in the bin R' has been lowered, by withdrawal from the bottom outlet of the bin, to a point where it is desired to replenish the supply of material in the bin. As previously noted, the plow operating mechanism M is so controlled that the plow P' is held in its "up" or nonoperating position shown in Figure 6 except when, at predetermined time intervals, it is permitted to drop into its "down" or plowing position (seen in Figure 4) provided the bin needs replenishing. When the plow mechanism is in the elevated non-plowing position of Figure 6 and the cable 15 is then moved to the left, the plow operating arm 17 will also move to the left carrying with it plow lifting portion 17' (which, in Figure 6, is in engagement with the contact member 41') thus permitting the plow structure P', including the plow plates 33 and 34, to move downwardly toward the plowing position of Figure 4.

When the level of the material in the bin R' is as shown in Figure 4, the plow structure can move all the way down into its plowing position in which the stop arm 50 of plow P' engages a transverse stop bar 51 supported on the top of the bin R'. During the downward movement of the plow apparatus from the elevated position of Figure 6 the level control bar 48 strikes the material in the bin R' at level L before the plow plates 33 and 34 reach their lowermost position seen in Figure 4. When the level control bar 48 so engages the surface of the material it can, of course, not move any further downwardly and downward movement of test rod carrying arm 45 is also stopped in the position seen in Figure 4. Further downward movement of the plow P' is permitted however as the generally vertical cam surfaces 52 of control cam are so disposed as to allow such movement without interfering engagement with the pin or roller 49.

After remaining in plowing position for a time sufficient to scrape the desired quantity of material from the belt A into bin R' the operating mechanism M functions to pull the cable 15 to the right (Figure 4) swinging the arms 17—17' into the position of Figure 6 with consequent lifting of the plow P' by engagement of the end of arm 17' with the contact face 41' of the lifting arm 41. At the same time the test rod carrying arm 45 is lifted by the engagement of the roller 49 with the lower cam surface 53 of the control cam 40. As the vertical link 47 is carried by the end of arm 45, and as the sleeve 43 to which arm 45 is secured also carries the corresponding arm 44 to which the vertical link 46 is pivotally attached, the test bar 48 will be elevated into its maximum "up" position of Figure 6.

It will be understood that if the level of material in bin R' is below that indicated at L in Figure 4, the arms 44 and 45 and the structure 46—47—48 will be permitted to drop down below the position seen in Figure 4, the maximum lowering of the level control bar 48 being reached when the plow P' and its control cam 40 are in plowing position (Figure 4) and the roller 49 is resting on the lower cam face 53.

As previously explained, when the level of the material in the bin R' is above a predetermined value, plow P' is prevented from dropping into plowing position and is positively held above the level of material on belt A, even though the plow operating arm 17—17' is moved from the plow "up" position of Figure 6 into the plow "down" position of Figure 4. This is illustrated in Figure 5 in which the arm 17—17' has been moved counter-clockwise into plow "down" position by the movement of cable 15 to the left. When the level of material is as indicated at L' in Figure 5 the level control bar 48 is stopped in its downward movement by engagement with the material in the bin. When this occurs roller 49 and the arm 45 which guides and controls its movement cannot move further downwardly and the roller 49 will then move along the curved cam surface 54 of cam 40 until it reaches the plow holding notch or recess 55 which acts as a stop preventing further movement of the cam member 40 relative to the roller 49 and holding the plow P' in the intermediate locked-in non-plowing position seen in Figure 5.

If the level of material in the bin should be above that seen at L' in Figure 5 when the plow lowering cycle takes place the roller 49 will engage the cam surface 54 at some point to the left of the notch 55 (Figure 5) and will prevent the plow P' from dropping into plowing position although the arm 17 will move all the way to its full plow released position. Such a condition is indicated in Figure 6 in which material level L'' is somewhat higher than that seen at L' in Figure 5.

From the above description it will be seen that the apparatus illustrated for supporting and controlling the movements of the plows is automatically effective to drop each plow into plowing position at each lowering movement of the plow cable provided the level of material in the bin with which the particular plow is associated is at or below a predetermined value, but will prevent the plow from dropping into plowing position if the level of material is above as predetermined value. Thus, although the cycle of lifting and lowering movements of the plow operating cables is continuous, material will be removed from the belt into each bin only when that particular bin needs material.

Figure 8 illustrates the plow operating means whereby the cables 14 and 15 are pulled to elevate the plows controlled by each cable and released to permit the plows to drop. The operating mechanisms M and M' are identical so it will suffice to describe unit M' which actuates cable 14 and plows P and includes a drive motor 56, a reduction gear box 57, a drive shaft 58, a crank arm 59, and the connecting link 22. When the unit M' is in the position seen in Figure 9 the crank arm 59 is in its vertical "up" position and the cable 14 has been released so that it has been moved by the counterweigh as its opposite end to its farthest left (Figure 1) position and the plows P will be in their lowered or plowing positions. The timing of the operation of units M and M' is such that unit M is 180° out of phase with unit M'. Thus, when the plows P are lowered the plows P' will be held in their "up" positions (as seen in Figure 6), and vice versa.

Returning to the operation of unit M', after the plows P have been permitted to remain lowered for the desired plowing time (sufficient to remove a predetermined amount of material from the belt A into the bins R being serviced) the motor 56 is started and the crank arm 59 is moved in counter-clockwise direction through 180° until it strikes the bottom limit switch 60 which breaks the circuit to drive motor 56 and causes the arm 59 to stop in its bottom or down position seen in phantom lines in Figure 9. When the crank 59 reaches this position the horizontal portion of cable 14 has been pulled to the right (Figure 1) to lift all three of the plows P into their full "up" positions. After a desired delay, during which the plows P' are dropped into plowing position and lifted back to their "up" positions, the motor 56 is again actuated to rotate crank arm 59 in clockwise direction until it engages the upper limit switch 61 which is effective to stop the motor 56 with the arm 59 in its upper or plowing position for another plowing operation by plows P. This alternate plow lifting and lowering operation of plows P and P' is continued for so long as the installation is in operation.

Figure 10:
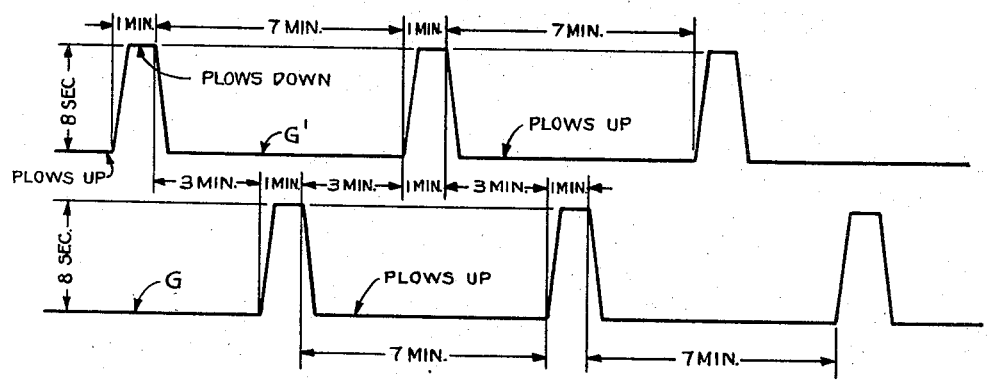
Figure 10 is a time cycle diagram showing a typical plow operating cycle for tne apparatus illustrated herein.

Figure 10 shows an illustrative operating cycle of the units M and M' and the plows P' and P that are actuated thereby. The lower line G represents the cycle of operating unit M and its plows P' while the upper line G' represents the cycle of unit M', and its plows P. Referring to line G', it will be seen that at the left end of the line the plows P are "up." In this condition the crank arm 59 of drive unit M' is in its down position seen in phantom lines in Figure 9. The timing mechanism for the units M and M' (which is not illustrated as it per se forms no part of the present invention but which may be of any suitable well-known type) then starts the motor 56 to move arm 59 from its down position to its vertical up position. As is indicated by the vertical rise of line G' this change from plows up position to plows down position is accomplished in eight seconds. The limit switch 61 stops the arm 59 in its up position and the elevated portion of line G' indicates that the total time, including the eight seconds it takes to lower same to plowing position, that the plows P remain down is one minute. The speed of belt A is such that it will move twice the distance between one plow P and the adjacent plow P' during the one minute plowing time. Thus, if all of the plows P are lowered the belt will be cleared of material. At the end of this minute the timer mechanism (not shown) reactivates the motor 56 which then, during the next eight seconds, moves the crank arm 59 back into its "up" position where it is stopped by limit switch 60 and held there until seven minutes have elapsed whereupon the one minute plow lowering cycle is repeated.

The cycle of plows P', which is established by the operation of unit M and is represented by line G (Figure 10) is identical with that just described, but the one minute plow "down" portions of the cycle of plows P' occur midway of the seven minute plow "up" times of plows P, and vice versa.

The speed of the belt A is correlated with the timing of the up and down movements of the plows so that, after the three plows P have been down for one minute and have removed material into their respective bins (if required) and then have been again lifted into "up" position, a sufficient time (approximately three minutes in the cycle of Figure 10) elapses during which the belt A will advance a distance at least as great as the distance between the first plow P and the last plow P'. This correlation of belt speed to the plow operation and the spacing between the bins and plows assures that when, after three minutes of non-plowing movement of belt A in the illustrated example, the plows P' are dropped into plowing position the belt will be fully charged immediately in advance of each plow so that a full quantity may be scraped off into bins R' by each of the plows P' if material is called for.

Of course if the double cable arrangement illustrated and described herein were not employed and all of the plows of the series of bins were operated by a single cable and control unit, it would still be necessary, at the end of a given plowing period, to hold the plows up until the belt had advanced at least the full length of the row of bins so that when the plows were next lowered a fully charged belt would be positioned in advance of each plow. It will be observed that with such a single cable arrangement only the load on the belt between two adjacent plows would be plowed off into any one bin in one plowing period, as distinguished from the double cable embodiment in which each plowing period removes twice that amount of material.

In operation of this type of apparatus, as has been noted above, at times one or more bins will not call for material when the plow lowering operation takes place. Under such conditions the plowing step will be skipped or omitted and the material, which would have been removed had the bins needed refilling, will merely be carried on by the belt A and discharged into the overflow bin 9 from whence, together with make-up material, it is returned to the charge end of belt A by the conveyor system. My improved apparatus may readily be adjusted to take care of varying rates of withdrawal from the bins R—R'. For example if larger quantities of material are to be withdrawn from the bins in a given time the proper level therein may still be maintained by speeding up the belt A and reducing the time lapse between the plowing portions of the cycle.

It will be observed from the above description of the illustrated apparatus and its operation that my improved method is applicable to the supplying of material to one or more bins or the like and maintaining a desired level of material therein. The method includes moving a belt carrying substantially constant uniform stream or charge of material toward the bin, or the first of a series of bins, then intermittently diverting material from the belt, as by scraping or plowing, into the inlet of the bin for a certain predetermined time period, and repeating this scraping or diverting step at predetermined time intervals. However in the event that the bin, or one or more of the series of bins, is filled with material up to a certain established and predetermined level, material is not diverted from the belt during any given plowing or scraping time period and will not be diverted into the filled bin until its level falls below the predetermined value. The further steps of my method include continuing to move the material which is not diverted after it passes the bin or bins, adding to the undiverted material additional or make-up material, and continuing to move the stream of undiverted and make-up material by the conveyor system in a substantially endless path so that as the belt A approaches the bin (or the first of the series of bins as illustrated) it will at all times be fully charged and the stream of material which approaches the first plow station point will be substantially uniform in quantity and distribution on the belt. By thus moving the material on a substantially endless conveyor system, diverting material from the conveyor into the bins at spaced time intervals, but only when a bin calls for material, and adding additional material to the conveyor system in sufficient quantity to replace that which is discharged into the bins, I provide a procedure which automatically prevents either a single bin, or any of a series of bins, from ever being emptied by withdrawal therefrom to such a degree that an inadequate reserve supply remains in the bin.

Although I have described the illustrated embodiment of my improved material handling and distributing apparatus and a preferred method of operating same in considerable detail, it will be understood that variations and modifications may be made in the form and arrangement of the apparatus employed, and in the particular steps of my method, without departing from the spirit of my invention. I do not, therefore, wish to be limited to the exact structure and procedure herein illustrated and described but claim as my invention or embodiments thereof coming within the scope of the appended claims.

I claim:

1. Apparatus for maintaining the level of loose flowable material at or above a predetermined height in a bin having an inlet opening including, a supply belt supported for movement across and above said inlet opening, means for moving said supply belt across said opening, means for supplying material to said supply belt in advance of said bin, a plow pivotally supported above said belt and said inlet opening for movement toward and away from said belt, an operating arm for said plow adapted to engage and lift said plow from a lower plowing position into an upper non-plowing position, said operating arm being movable independently of said plow, a control cam movable with said plow, a level control member disposed in said bin, a level control member carrying arm pivotally mounted at one end adjacent but in spaced relation to the pivotal support of said plow member and carrying said level control member at the other end, a cam follower movable with said level control member carrying arm and adapted to engage said control cam, and means for intermittently moving said plow operating arm from its plowing to its non-plowing position and return at predetermined spaced times, said control cam having a camming surface which permits unrestricted downward movement of said plow when said level control member has unrestricted downward movement but which, when said level control member is blocked in its downward movement by engagement with material in the bin at or above a predetermined level, will cause the engagement of said cam follower with said camming surface to block downward movement of said plow member into the path of material on said belt regardless of movement of said plow operating arm into plowing position.

2. In material handling apparatus, a series of spaced bins disposed in a straight line and each having an upwardly opening inlet opening, a supply belt having a material carrying reach thereof extending across and above said inlet openings, a series of plow means supported one over each of said inlet openings above said reach of said belt, said plow means each being movable between an elevated non-plowing position and a lowered plowing position in which the plow will scrape material off said belt into the adjacent inlet opening, plow operating arms associated with each of said plows and adapted to engage and lift said plows and to be lowered while the plows remain in said elevated position, an operating cable connected to said plow operating arms and extending parallel to said belt, and means for moving said cable in one direction to effect lifting of said plows into elevated non-plowing position and in the opposite direction to permit lowering of said plows into plowing position.

3. In material handling apparatus, a series of spaced bins disposed in a straight line and each having an upwardly opening inlet opening, a conveyor belt having a material carrying reach thereof extending across and above said inlet openings, a series of plow means supported one over each of said inlet openings above said reach of said belt, said plow means each being movable between an elevated non-plowing position and a lowered plowing position in which the plow will scrape material off said belt into the adjacent inlet opening, plow operating arms associated with each of said plows and adapted to engage and lift said plows and to be lowered while the plows remain in said elevated position, an operating cable connected to said plow operating arms and extending parallel to said belt, means for moving said cable in one direction to effect lifting of said plows into elevated non-plowing position and in the opposite direction to permit lowering of said plows into plowing position, a series of level control means associated one with each of said bins, each of said level control means being responsive to the level of material in the bin with which it is associated, and operating connections between said level control means and said plow means for holding the plow means in elevated position during movement of said cable in plow lowering position when the height of material in the adjacent bin is above a predetermined level.

4. In material handling apparatus, a series of spaced bins disposed in a straight line and each having an upwardly opening inlet opening, a supply belt having a material carrying reach thereof extending across and above said inlet openings, a series of plow means supported one over each of said inlet openings above said reach of said belt, said plow means each being movable between an elevated non-plowing position and a lowered plowing position in which the plow will scrape material off said belt into the adjacent inlet opening, plow operating arms associated with each of said plows and adapted to engage and lift said plows and to be lowered while the plows remain in said elevated position, an operating cable connected to said plow operating arms and extending parallel to said belt, a series of level control means associated one with each of said bins, each of said level control means being responsive to the level of material in the bin with which it is associated, operating connections between each of said level control means and its adjacent plow means for holding the plow means in elevated position during movement of said cable in plow lowering position when the height of material in the adjacent bin is above a predetermined level, and means for moving said cable in plow lifting and lowering direction in a predetermined repeating time cycle whereby said plow means are simultaneously lifted and held in non-plowing position for a period of time, then lowered into plowing position and permitted to remain in plowing position for a predetermined period of time, and then elevated into non-plowing position, and the cycle repeated continuously during operation of the apparatus.

5. In material handling apparatus, a series of spaced bins disposed in a straight line and each having an upwardly opening inlet opening, a supply belt having a material carrying reach thereof extending across and above said inlet openings, a series of plow means supported one over each of said inlet openings above said reach of said belt, said plow means each being movable between an elevated non-plowing position and a lowered plowing position in which the plow will scrape material off said belt into the adjacent inlet opening, plow operating arms associated with each of said plows and adapted to engage and lift said plows and to be lowered while the plows remain in said elevated position, an operating cable connected to said plow operating arms and extending parallel to said belt, a series of level control means associated one with each of said bins, each of said level control means being responsive to the level of material in the bin with which it is associated, operating connections between each of said level control means and its adjacent plow means for holding the plow means in elevated position during movement of said cable in plow lowering position when the height of material in the adjacent bin is above a predetermined level, means for moving said cable in plow lifting and lowering direction in a predetermined repeating time cycle whereby said plow means are simultaneously lifted and held in non-plowing position for a period of time, then lowered into plowing position and permitted to remain in plowing position for a predetermined period of time, and then elevated into non-plowing position, and the cycle repeated continuously during operation of the apparatus, a receptacle disposed adjacent the discharge end of said supply belt and adapted to receive material not removed therefrom by said plow means, a return conveyor belt disposed to receive material from said receptacle, additional conveyor belts disposed to convey material from said return conveyor belt back to the charging end of said supply belt, and means for depositing make-up material on one of said conveyor belts in quantity substantially equal to that removed by said plow means whereby a substantially constant uniform supply of material is carried on said supply belt to the first bin of said series.

6. Material handling apparatus as defined in claim 2 in which the plow means for the odd numbered bins, starting at one end of said series, are connected to one operating cable and the plow means for the even numbered bins are connected to a second operating cable extending parallel to said first named cable, and a pair of cable moving means are provided, one for each of said cables, said cable moving means being timed relative to each other so that the plow means on the odd numbered bins are held in non-plowing position while the plow means on the even numbered bins are disposed in plowing position, and vice versa.

References Cited in the file of this patent

UNITED STATES PATENTS

| | | |
|---|---|---|
| 1,882,440 | Naylor | Oct. 11, 1932 |
| 1,939,368 | Rydmark et al. | Dec. 12, 1933 |
| 1,971,716 | Hitchcock | Aug. 28, 1934 |
| 2,529,583 | Adams | Nov. 14, 1950 |
| 2,562,427 | Hurter | July 31, 1951 |
| 2,579,562 | Fruechtel | Dec. 25, 1951 |
| 2,613,832 | Ogorzaly | Oct. 14, 1952 |
| 2,614,707 | Bilterman | Oct. 21, 1952 |